United States Patent [19]

Yasuda et al.

[11] Patent Number: 5,340,221
[45] Date of Patent: Aug. 23, 1994

[54] BEARING RING WITH PARALLEL FLOW INTERNAL STRUCTURE

[75] Inventors: Yoshinobu Yasuda, Kuwana; Fukuhiro Tsushi, Kobe; Tohru Mayumi, Tsu, all of Japan

[73] Assignee: NTN Corporation, Osaka, Japan

[21] Appl. No.: 104,448

[22] Filed: Aug. 10, 1993

Related U.S. Application Data

[62] Division of Ser. No. 934,850, Aug. 25, 1992, Pat. No. 5,261,159.

Foreign Application Priority Data

May 25, 1992 [JP] Japan .................. 4-132542

[51] Int. Cl.$^5$ .................. F16C 33/64; F16C 33/60
[52] U.S. Cl. .................. 384/499; 29/412; 29/425; 29/898.063; 384/513
[58] Field of Search .............. 384/490, 492, 499, 502; 29/898.066

[56] References Cited

U.S. PATENT DOCUMENTS

| | | | |
|---|---|---|---|
| T102,401 | 11/1982 | Toth | 29/898.066 X |
| 1,366,026 | 1/1921 | Rydbeck | 384/492 |
| 3,343,895 | 9/1967 | Morrison | 29/898.066 X |
| 3,528,271 | 9/1970 | DiPonio | 29/898.066 X |
| 3,978,566 | 9/1976 | Ladin | 29/898.066 |
| 4,060,290 | 11/1977 | Brawley | 384/571 |

Primary Examiner—Thomas R. Hannon
Attorney, Agent, or Firm—Nikaido, Marmelstein, Murray & Oram

[57] ABSTRACT

A bearing ring manufactured by the method includes the steps of forming recesses in both ends of an outer peripheral surface of a material ring having fiber flows extending substantially parallel to the outer peripheral surface and cutting into two ring halves the material ring at its center with respect to the direction of width. The ring halves are then brought together with their ends having the recesses facing to each other to form a bearing ring.

7 Claims, 3 Drawing Sheets

BEARING RING WITH PARALLEL FLOW INTERNAL STRUCTURE

This is a division of application Ser. No. 07/934,850 filed Aug. 25, 1992, now U.S. Pat. No. 5,261,159.

This invention relates to a method of manufacturing a bearing ring of a split type.

Some of large-size bearings such as turn table bearing have a ring split in two at its center as shown in FIG. 3. Heretofore, in manufacturing such a split type bearing ring, as shown in FIG. 4a, a material ring 21 having parallel fiber flows (fibrous tissue phases) 22 is swaged. Then, as shown in FIG. 4b, the material ring 21 is rolled between a mandrel 30 and rolls 31, 32 to form a recess 23 for a raceway 26 in the center of its outer peripheral surface. The material ring 21 thus made is cut and machined to form symmetrical ring halves 24 and 25 as shown by chain lines in FIG. 4b. The ring halves 24 and 25 are brought together into a bearing ring by opposing their ends to each other.

But, in this method, when the recess 23 for a raceway is formed in the central part of the material ring 21 by rolling, the fiber flows are compressed strongly near the recess 23. When the material ring is cut and machined into the ring halves 24, 25, as shown in FIG. 5, the fiber flows 22 near the outer periphery of the raceway 26 will not be parallel to the raceway 26. As a result, many of the fiber flows 22 are interrupted. If the fiber flows are exposed broken at the raceway, the fatigue resistance of the raceway drops, thus shortening the life of the bearing.

FIGS. 6a–6c show another conventional method disclosed in Japanese unexamined patent publication 53-34667, in which a relief recess 27 is pre-formed in an inner periphery of the swaged material ring 21. When the material ring 21 is rolled with a roll 31 (FIG. 6c), the material ring 21 is pressed inwardly by the roll 31 toward the relief recess 27 to form a recess 23 as a raceway in the central part of its outer peripheral surface. In this method, when the material ring 21 is rolled, its fiber flows 22 extend parallel to the recess 23 as a raceway. Thus, the fiber flows 22 extend substantially parallel to the raceways of the ring halves 24 and 25 cut from the material ring 21.

But, in this method, the material ring 21 has to be cut out considerably in order to form beforehand the relief recess 27 in its inner peripheral surface. Thus, the yield of material is low.

Also, since the recess for forming a raceway is formed by pressing the material ring 21 toward the relief recess 27 and deforming the outer peripheral surface of the material ring 21 so as to gradually conform to the shape of the roll 31, it is difficult to form a deep raceway. In other words, this method limits the shape and size of the raceway formed.

It is therefore an object of this invention to provide a method of producing a bearing ring which is free of the above problems, and with which the fiber flows will not be interrupted near the raceway and a deep raceway can be formed easily with a minimum waste of material.

According to this invention, there is provided a method of manufacturing a bearing ring of a bearing comprising the steps of forming recesses in both ends of an outer peripheral surface of a material ring having fiber flows extending substantially parallel to the outer peripheral surface, cutting into two ring halves the material ring at its center with respect to the direction of width, and bringing the ring halves together with their ends having the recesses facing to each other to form a bearing ring.

According to this invention, recesses as a raceway are formed in both ends of the material ring by rolling. With this method, the fiber flows of the material ring can be reformed so as to extend substantially parallel to the raceway of the bearing ring, which was impossible with the conventional method in which a recess as a raceway was formed in the central part of the peripheral surface of the material ring. A raceway thus formed shows high fatigue resistance and the bearing ring thus formed shows a long life.

Further, with this method, there is no need to cut off the material to form a relief recess in order to deform the material ring in an opposite way as with the method shown in FIG. 6. Thus, the waste of material is minimum and the yield is high.

Moreover, since recesses as a raceway are formed in both ends of the material ring, a deep raceway can be formed with ease.

Other features and objects of the present invention will become apparent from the following description taken with reference to the accompanying drawings, in which:

FIGS. 1–3 show a method of manufacturing an inner ring of an angular ball bearing according to the present invention.

Figure 1:
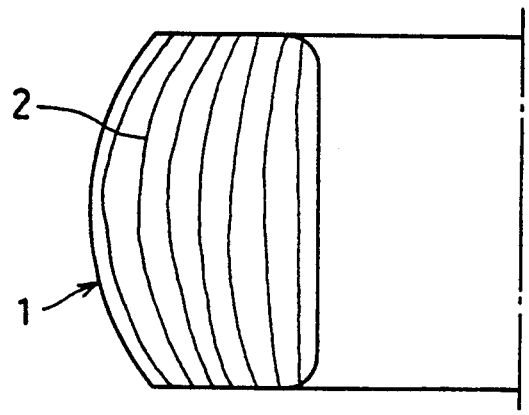
FIG. 1 is a sectional view showing schematically the shape of a material ring after swaged and its fiber flows in the embodiment.

In this method, a round bar is cut into a piece by machining, press forged, and bored by machining into a material ring 1 having fiber flows 2 extending substantially parallel to the axis of the ring as shown in FIG. 1.

Figure 3:
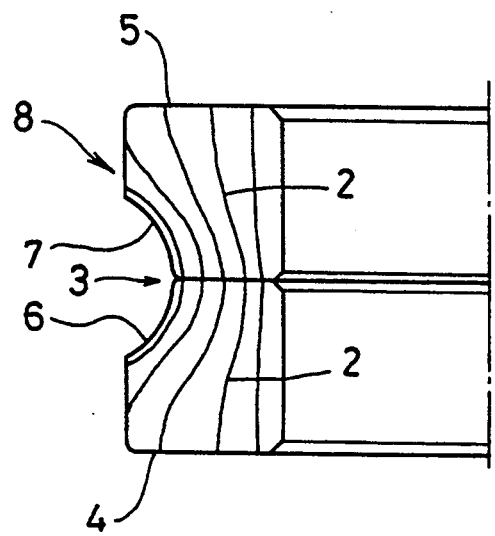
FIG. 3 is a sectional view showing the assembled inner ring.
Figure 2:
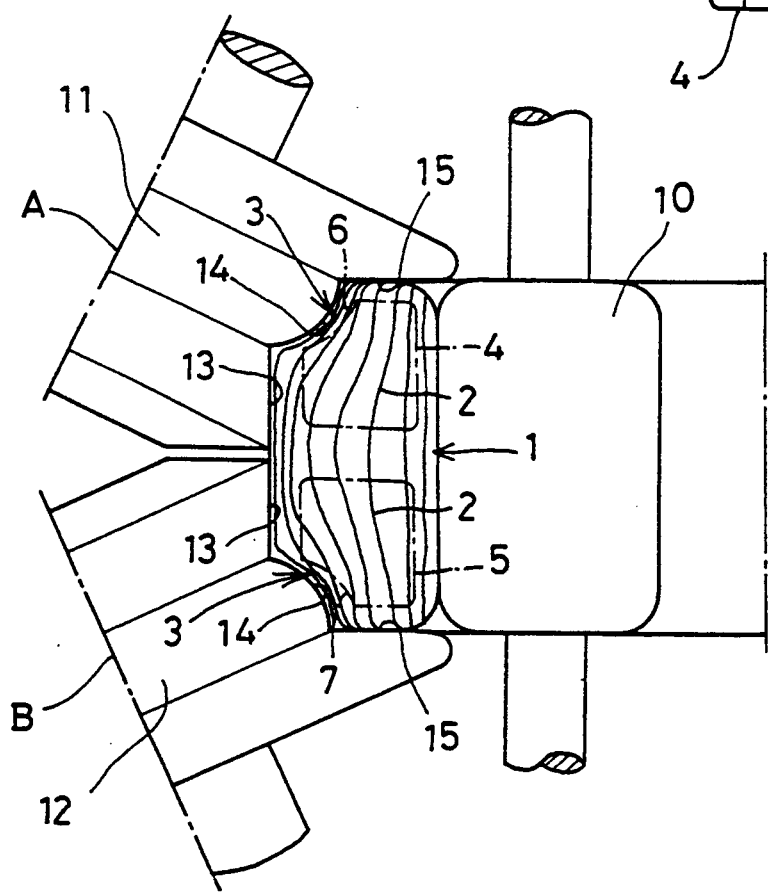
FIG. 2 is a sectional view showing how the material ring is rolled.

Next, as shown in FIG. 2, the material ring 1 is rolled with a mandrel 10 inserted into its hole and a pair of main rolls 11 and 12 pressed against the outer peripheral surface thereof. Each of the main rolls 11 and 12 has a head 13 for rolling the outer peripheral surface of the material ring 1, an arcuate protrusion 14 for forming a recess for a raceway and a flange 15 for restricting the end face of the material ring 1. The rolls 11, 12 are rotated about inclined axes A and B, respectively, with their flanges 15 arranged parallel to and opposite to each other. The arcuate protrusions 14 are formed not in the form of semicircular arcuate surfaces but in the form of curved surfaces protruding arcuately within the angular range of about 90° C. With these protrusions 14, recesses 3 are formed which are to be formed into raceway halves 6 and 7 of a semicircular raceway when assembled into an inner ring 8 as shown in FIG. 3.

In the abovesaid rolling operation, when the main rolls 11, 12 are rotated, the material ring 1 and the mandrel 10 will rotate by the frictional force, so that the outer peripheral surface and both end faces of the material ring 1 are rolled by the heads 13 and the flanges 15 of the main rolls 11 and 12 and at the same time, the recesses 3 are formed in both ends of the outer peripheral surface of the material ring 1 by the arcuate protrusions 14 provided between the heads 13 and the flanges 15.

Figure 4A:
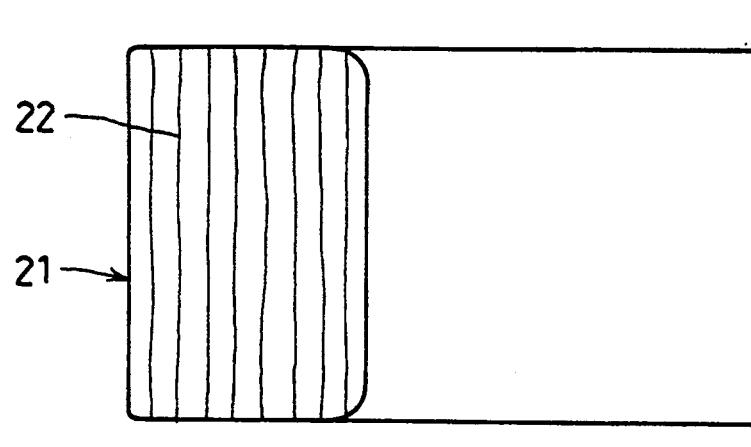
FIGS. 4a and 4b are sectional views showing schematically the shape of the material ring and how it is rolled in the conventional manufacturing method.
Figure 4B:
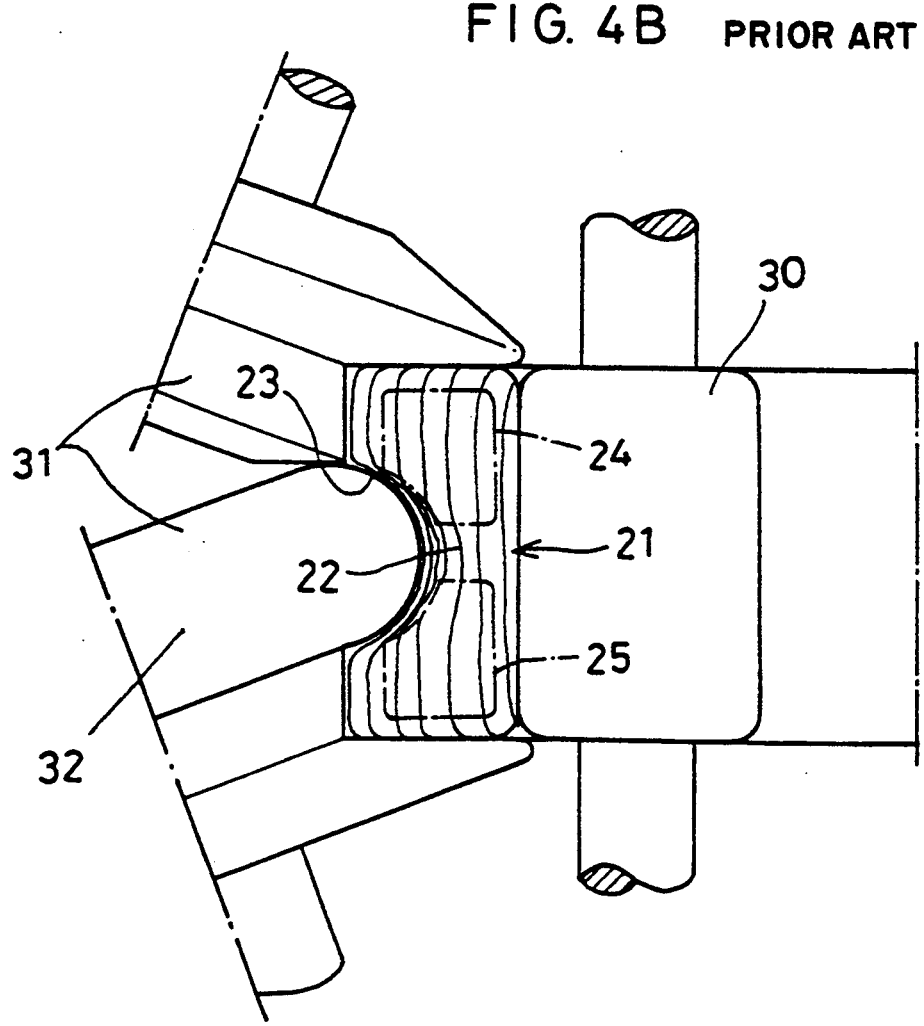
Figure 5:
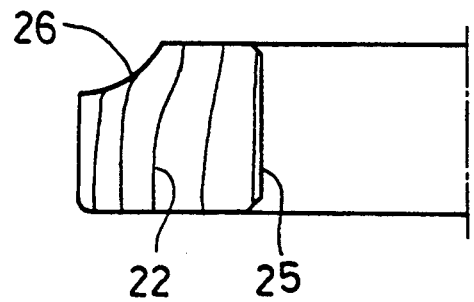
FIG. 5 is a sectional view showing the fiber flows on the ring halves of the same.
Figure 6A:
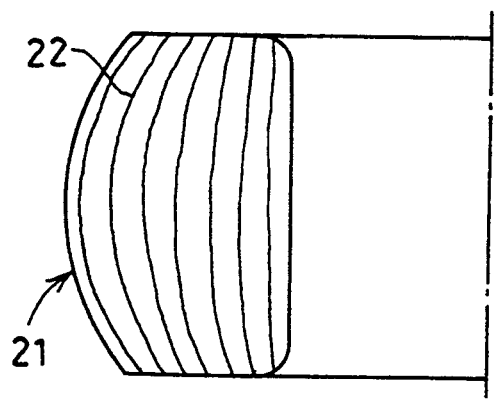
FIGS. 6a to 6c are sectional views showing schematically the shape of the material ring and how it is rolled in another conventional manufacturing method.
Figure 6B:
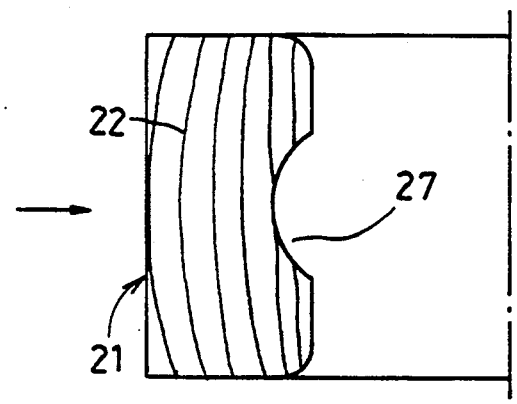
Figure 6C:
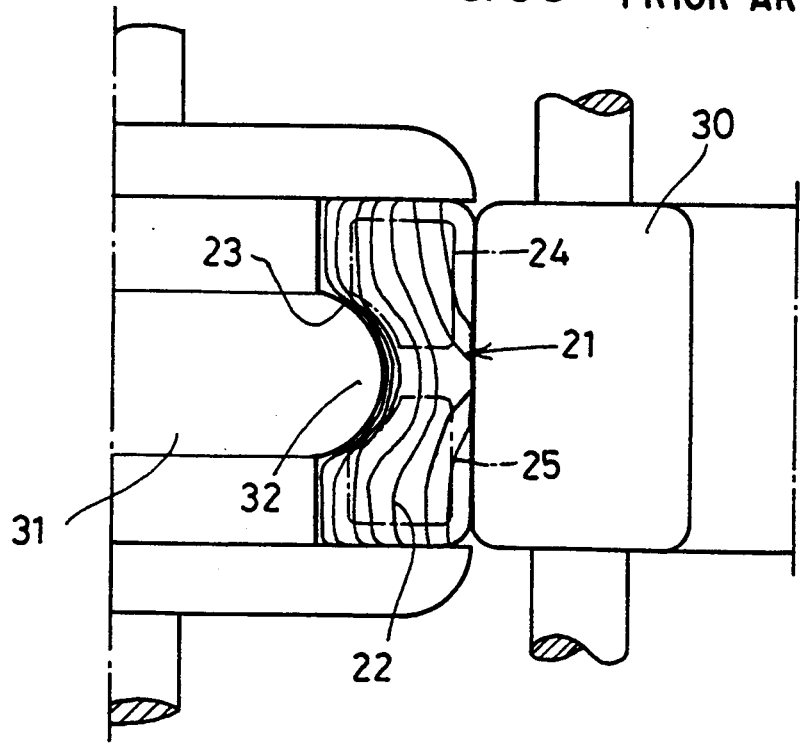

In this case, since the material ring 1 is rolled gradually inwards by the arcuate protrusions 14 from both ends of the outer peripheral surface, the fiber flows 2 on the outer peripheral surface of the material ring is deformed much less than with the conventional forming methods shown in FIGS. 4 and 6 in which the recess 23 for a semicircular raceway is formed by pressing the central portion of the outer peripheral surface of the material ring 21. Thus, the fiber flows 2 of the material ring 1 are substantially parallel to the rolling surfaces of the main rolls 11 and 12, so that in the rolled state shown in FIG. 2, the fiber flows 2 on the outer peripheral surface extend substantially parallel to the surfaces of the recesses 3.

The material ring 1 thus formed is then cut at the center with respect to the direction of width to form mutually symmetrical ring halves 4 and 5 as shown by chain lines in FIG. 2.

The ring halves 4 and 5 are then brought together with their end faces having raceways 6 and 7 facing to each other as shown in FIG. 3. The inner ring 8 is thus assembled or formed. The inner ring 8 thus assembled has fiber flows 2 extending substantially parallel to the raceways 6 and 7. Thus, even if the raceways 6 and 7 are ground further, the ends of the fiber flows 2 will never be exposed to the raceways. Thus, the inner ring has high fatigue resistance.

In the above embodiment, the material ring is swaged before rolling. But this swaging step is not essential and may be omitted.

In the above example, we described the manufacture of an inner ring of an angular ball bearing. But the method of the present invention is also applicable to the production of inner rings of other split type ball bearings and roller bearings as well as the production of split type outer rings.

What is claimed is:

1. A bearing ring, having an axis, comprising first and second substantially half bearing ring sub-members joined together along surfaces which are substantially transverse to said axis; wherein each of said sub-members comprises, respectively:

a first and a second inner circumference surface portion on each sub-member, respectively, which together form an inner circumference surface of said bearing ring;

a first and a second outer circumference surface portion on each sub-member, respectively, which together form an outer circumference surface of said bearing ring;

juxtaposed first and second lands on said first and second sub-members, respectively, each being between said first and said second inner circumference surface portions, respectively, and said first and said second outer circumference surface portions respectively;

a first arcuate surface disposed at an intersection between said first land and a first circumference surface portion;

a second arcuate surface disposed at an intersection between said second land and a second circumference portion corresponding to said first circumference surface portion, which arcuate surfaces taken together form a substantially continuous arcuate raceway in said circumference surface of said bearing ring;

a third land on said first sub-member disposed between, and in contact with, said inner circumference surface portion and said outer circumference surface portion of said first sub-member, respectively, which third land is exposed on said bearing ring; and a fourth land on said second sub-member disposed between, and in contact with, said inner circumference surface and said outer circumference surface portion of said second submember, respectively, which fourth land is exposed on said bearing ring;

wherein the material of said bearing ring comprises an internal structure which, proximate to said outer circumference surfaces, flows in a convex direction relative to the axial direction of said bearing ring, and which, proximate to said arcuate surfaces, flows substantially parallel thereto.

2. A bearing ring as claimed in claim 1 wherein each portion of said outer circumference surface comprises a substantially convex shape, relative to said axial direction, from said raceway to said third and fourth lands, respectively.

3. A bearing ring as claimed in claim 2 wherein said raceway is deep.

4. A bearing ring as claimed in claim 2 wherein said sub-members are substantially congruent.

5. A bearing ring as claimed in claim 2 wherein said raceway is substantially semi-circular.

6. A bearing ring as claimed in claim 2 in combination with ball bearings.

7. A bearing ring as claimed in claim 2 wherein said raceway is in said outer circumference surface.

* * * * *